United States Patent
Malvar et al.

(10) Patent No.: US 7,065,252 B1
(45) Date of Patent: *Jun. 20, 2006

(54) SYSTEM AND METHOD PROVIDING IMPROVED DATA COMPRESSION VIA WAVELET COEFFICIENT ENCODING

(75) Inventors: Henrique S Malvar, Sammamish, WA (US); Patrice Y Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/091,068

(22) Filed: Mar. 28, 2005

Related U.S. Application Data

(63) Continuation of application No. 09/756,348, filed on Jan. 8, 2001, now Pat. No. 6,891,974.

(51) Int. Cl.
*G06K 9/36* (2006.01)
*H04N 1/41* (2006.01)

(52) U.S. Cl. ............... 382/232; 382/236; 382/245; 382/251; 382/253; 358/426.14

(58) Field of Classification Search ............... 382/232, 382/166, 207, 206, 236, 245, 251, 253, 250; 358/426.01, 426.13, 426.14, 426.02
See application file for complete search history.

(56) References Cited

U.S. PATENT DOCUMENTS

| | | | |
|---|---|---|---|
| 4,651,221 A * | 3/1987 | Yamaguchi | 358/444 |
| 6,173,079 B1 * | 1/2001 | Hwang | 382/239 |
| 6,343,155 B1 * | 1/2002 | Chui et al. | 382/240 |
| 6,389,334 B1 * | 5/2002 | Castor | 701/3 |
| 6,549,674 B1 * | 4/2003 | Chui et al. | 382/240 |
| 6,678,422 B1 * | 1/2004 | Sharma et al. | 382/240 |
| 6,734,896 B1 * | 5/2004 | Nobori et al. | 348/148 |
| 6,741,739 B1 * | 5/2004 | Vincent | 382/191 |
| 6,831,946 B1 * | 12/2004 | Jeong | 375/240.01 |
| 6,891,974 B1 | 5/2005 | Malvar et al. | |
| 6,904,175 B1 * | 6/2005 | Chao et al. | 382/240 |
| 6,973,127 B1 * | 12/2005 | Kolesnik et al. | 375/240.11 |
| 2002/0006229 A1 * | 1/2002 | Chao et al. | 382/240 |
| 2002/0047901 A1 * | 4/2002 | Nobori et al. | 348/149 |
| 2002/0196340 A1 * | 12/2002 | Kato et al. | 348/148 |
| 2003/0160986 A1 * | 8/2003 | Nakajima | 358/1.9 |

FOREIGN PATENT DOCUMENTS

| | | | |
|---|---|---|---|
| JP | 409261644 | * | 10/1997 |
| JP | 02000127332 | * | 5/2000 |

OTHER PUBLICATIONS

William B. Pennebaker et al. JPEG: Still Image Data Compression STandard, Van Nostrand Reinhold, Dec. 1992, pp. 65-79 and 317-330.*

Amir Said, William Peralman, A new Fast and Efficient Image Codec Based on Set Partitioning in Hierarchical Trees, IEEE Trans. on Circuits and Systems for Video Tech. Jun. 1996; pp. 1-6, vol. 6.*

(Continued)

*Primary Examiner*—Jerome Grant, II
(74) *Attorney, Agent, or Firm*—Amin & Turocy, LLP

(57) ABSTRACT

A data compression system is provided in accordance with the present invention. The system includes a scanning component which scans at least a portion of a transformed image. The scan is performed substantially in a horizontal direction on a first section of the portion and in a vertical direction on a second section of the portion to enable improved data compression of the transformed image. The horizontal and vertical scan directions are performed via a contiguous scan of the respective sections to further enable improved data compression of the transformed image.

19 Claims, 4 Drawing Sheets

OTHER PUBLICATIONS

Henrique Malvar, Fast Progressive Wavelet Coding, IEEE DCC ' 99 Conference, Mar. 4, 1999 ;pp. 1-8.*

H. Malvar Fast Progressive Image Coding Without Wavelets IEEE DCC' 00; Conference, Mar. 2000 pp. 1-10.*

Jerome Ghapiro, Embedded Image Coding Using Aerotrees of Wavelet Coefficient, IEEE Transactions on Signal Processing Dec. 1993 pp. 3445-3462; vol. 41, No. 12.*

William Pennebaker, Joan Mitchell; PPEG: Still Image Data Comp Stand. Dec. 1992, Springer.*

Chang PC (REPRINT); Lu TT; "A Scalable Video Compression Technique based on Wavelet Transform and MPEG Coding"; IEEE Transactions on Consumer Electronics, vol. 45, No. 3, 1999, p. 788-793.

Christopoulos C (REPRINT), et al.; "The JPEG2000 Still Image Coding System: An Overview", IEEE Transactions on Consumer Electronics, vol. 46, No. 4, 2000, p. 1103-1127.

Shen-Fu Hsiao, et al.; "VLSI Design of an Efficient Embedded Zerotree Wavelet Coder with Function of Digital Watermarking", IEEE Transactions on Consumer Electronics, vol. 46, No. 3, Aug. 2000, p. 628-636.

Shively, R.R., et al.; "Generalizing SPIHT: A Family of Efficient Image Compression Algorithms", 2000 IEEE International Conference on Acoustics, Speech, and Signal Processing, vol. 4, 2000, p. 2059-2062.

P. Cosman, et al. "Combined Forward Error Control and Packetized Zerotree Wavelet Encoding for Transmission of Images Over Varying Channels" IEEE Transactions on Image Processing, 1998, p. 1-27.

Paul Bao, et al.; "Multiresolution Image Morphing in Wavelet Domain", 2000, p. 309-314.

Margaret A. Lepley and Richard D. Forkert; "AWIC: Adaptive Wavelet Image Compression" Sep. 1997, 72 pages.

* cited by examiner

SYSTEM AND METHOD PROVIDING IMPROVED DATA COMPRESSION VIA WAVELET COEFFICIENT ENCODING

CROSS REFERENCE TO RELATED APPLICATIONS

This application is a continuation of U.S. application Ser. No. 09/756,348, filed Jan. 8, 2001, entitled SYSTEM AND METHOD PROVIDING IMPROVED DATA COMPRESSION VIA WAVELET COEFFICIENT ENCODING now U.S. Pat. No. 6,891,974. The entirety of this application is incorporated herein by reference.

TECHNICAL FIELD

The present invention relates generally to computer systems, and more particularly to a system and method for compressing image data via wavelet transforms applied to an image followed by an encoding scan sequence of resultant groupings of wavelet coefficients. This provides increased correlation between the wavelet coefficient groups to enable improved data compression of the encoded sequence.

BACKGROUND OF THE INVENTION

Computer systems and related technologies such as the Internet have transformed modern society. This has become even more apparent as digital image/video technologies have become dominant—in business, on the Internet and in the home. In many homes for example, digital technologies such as DVD and digital cameras have replaced older analog technologies. As the Internet has exploded in popularity, digital images and moving pictures are routinely transmitted countless times per day. As these technologies have increased in popularity however, technical challenges relating thereto still remain. Stored digital images often times require storing/transmitting large amounts of data in order to reproduce a desired image or in the case of video, a desired sequence of images. In the case of the Internet for example, transmitting large amounts of data reduces network efficiency/speed and increases user frustration in relation to delays waiting for requested data. Thus, systems designers and architects have developed digital compression systems to reduce data storage and transmission requirements associated with digitized images.

In relation to compression of images, redundant image features (e.g., long runs of a similar color) are often exploited to enable reduction of stored data. A common characteristic of many images is that neighboring pixels are correlated and therefore contain redundant information. Thus, an image compression objective is to detect and exploit correlated representations of the image. As an example, this objective may be achieved via redundancy and irrelevancy reduction. Redundancy reduction is directed at removing duplication from a signal source such as image and/or video, whereas irrelevancy reduction omits/filters parts of the image that may not be noticed and/or perceived by humans. In general, three types of redundancy may be identified: Spatial Redundancy or correlation between neighboring pixel values, Spectral Redundancy or correlation between different color planes or spectral bands, and Temporal Redundancy or correlation between adjacent frames in a sequence of images (e.g., video applications).

Image compression generally attempts to reduce the number of bits needed to represent an image by removing the spatial and spectral redundancies as much as possible. One popular image compression technology has been the Joint Photographic Experts Group (JPEG) standard. While JPEG is still employed in many applications, performance of coders based on this standard generally degrades at low bit rates mainly due to an underlying block-based Discrete Cosine Transform (DCT) scheme. More recently however, wavelet transform based coding has emerged in the field of image compression. According to wavelet-based technologies, image pixels are linearly transformed into a domain of wavelet coefficients via a discrete wavelet transform, for example. The wavelet coefficients may then be quantized wherein the number of bits required to store the transformed coefficients are reduced by reducing the precision of the coefficients, thus providing compression of the transformed data. The quantized data may then be scanned by an encoder (e.g., run-length encoder), wherein further compression may be achieved.

Many conventional compression systems, however, provide the quantized coefficients to the encoder by scanning the coefficients in predictable, if not well-known, patterns (e.g., repeated horizontal scans starting from the same side of a plurality of coefficients stored in groups). Unfortunately, these types of scanning patterns may not enable efficient compression within the encoder since the scanning pattern may affect correlation between coefficient groups, and the efficiency of the encoder (e.g., vertical vs. horizontal scanning, peano vs. linear scanning).

Although, wavelet based compression technologies generally provide improved image quality at higher compression ratios than JPEG based systems, there is a need for a system and/or methodology to facilitate improved data compression of wavelet-based compression and encoding systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology providing improved image compression. Image compression is improved over conventional systems by applying a contiguous scanning pattern to defined regions of a transformed image and alternating vertical and horizontal scan directions within the defined regions during encoding of the transformed image. The contiguous scanning pattern of the present invention enables fewer jumps (a jump occurs when two coefficients that are not adjacent are scanned successively) than plain linear scanning within a region—thus, compression is improved. Furthermore, the contiguous scanning patterns are alternated between a vertical contiguous pattern and a horizontal contiguous pattern depending upon a filtering pattern applied to the image. In this manner, wavelet coefficients are more likely to be correlated and thus, image compression is further improved over conventional systems.

According to one aspect of the present invention, a data compression system is provided. The system includes a scanning component which scans at least a portion of a transformed image. The scan is performed substantially in a horizontal direction on a first section of the portion and in a vertical direction on a second section of the portion to enable improved data compression of the transformed image.

According to another aspect of the present invention, a method is provided for data compression. The method includes: scanning at least a portion of a transformed image in substantially a horizontal direction on a first section of the portion; and scanning in a vertical direction on a second section of the portion of the transformed image to enable improved data compression of the transformed image.

In accordance with another aspect of the present invention, a data compression system is provided. The system includes: means for scanning at least a portion of a transformed image in substantially a horizontal direction on a first section of the portion; and means for scanning in a vertical direction on a second section of the portion of the transformed image to enable improved data compression of the transformed image.

According to another aspect of the invention, an image compression system is provided. The system includes a wavelet transform subsystem for transforming an image into wavelet coefficients and a scanning component which contiguously scans at least a portion of the transformed image. The contiguous scan is performed substantially in a horizontal direction on a first section of the portion and in a vertical direction on a second section of the portion to enable improved data compression of the transformed image.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
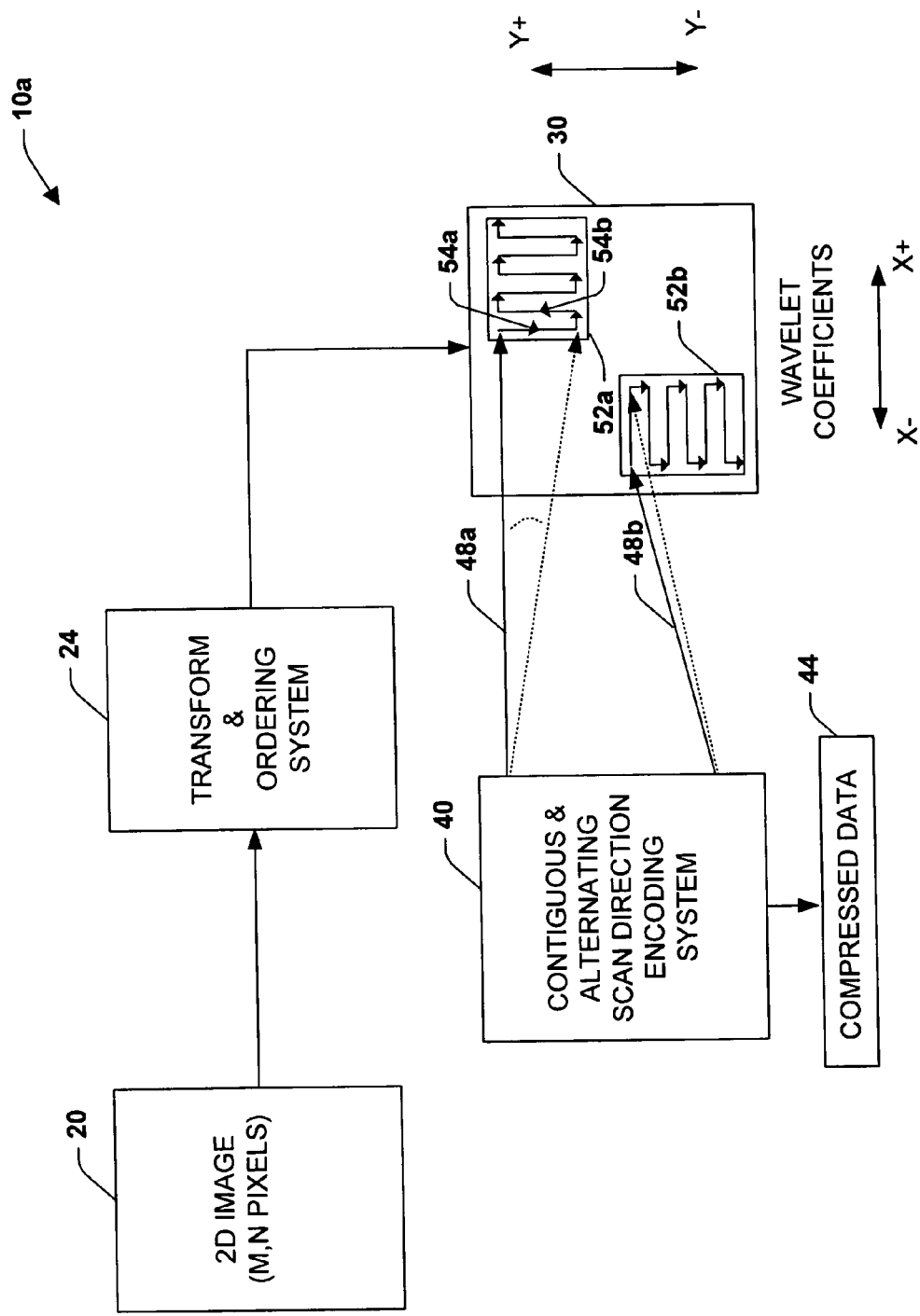
FIG. 1 is a schematic block diagram illustrating a contiguous and alternating scan system in accordance with an aspect of the present invention.

The present invention is now described with reference to the drawings, wherein like reference numerals are used to refer to like elements throughout.

The present invention relates to a system and methodology to facilitate improved image data compression in a wavelet based encoding system. In accordance with an aspect of the present invention, a two dimensional image of pixels may be linearly transformed into wavelet coefficients via a wavelet transform. The coefficients may be generated by applying a sequence of low and high pass transforms (e.g., filters) to portions of the image, for example. The wavelet coefficients are then quantized and reordered into a matrix of sub-bands associated with the low and high pass filters, wherein the sub-bands may be further subdivided into coefficient groups. The coefficient groups may then be scanned (e.g., read/input by an encoder) in accordance with a scan pattern and/or sequence of the present invention to provide improved image compression over conventional systems.

A contiguous scan pattern may be employed to increase the correlation of the coefficients that are sent to the encoder. In this manner, a block (e.g., a convex region) may be scanned contiguously by ensuring that a visited location is adjacent to a previously visited location. For example, a square block may be visited by scanning horizontally each line from top to bottom and enforcing that even lines are scanned in one direction, while odd lines are scanned in the other direction. Reducing the number of discontinuity (e.g., scanning successively two non-adjacent pixels) increases data compression over conventional systems that may scan from side-to-side and always start a scan on the same side of a coefficient group. Data compression is further improved over conventional systems by alternating scan directions between coefficient groups. As will be described in more detail below, a low-high (LH) coefficient grouping may utilize a vertical scan pattern wherein a high-low (HL) coefficient grouping may utilize a horizontal scan pattern. In this manner, coefficient data that is input to the encoder is more likely to be correlated between coefficient groups thereby increasing the probability of providing succession of highly correlated coefficients to the encoder, thus compression is improved.

A purpose for scanning LH vertically and HL horizontally is that the two directions are not symmetrical. For instance, LH is the result of applying a vertical low pass filter and a horizontal high pass filter. This results in a higher correlation between coefficients adjacent vertically than between coefficients adjacent horizontally. Thus, scanning LH vertically will yield a higher correlation than scanning LH horizontally. Such correlation can and will be detected by an encoder (such as Golomb-Rice) to yield higher compression. Similarly, blocks in the HL band should be scanned horizontally for highest compression. Thus, within the same image, some blocks should be scanned vertically while others should be scanned horizontally.

Referring initially to FIG. 1, a system 10a illustrates an aspect of contiguous and alternating scan direction encoding in accordance with the present invention. A two-dimensional (2D) image 20, having M rows and N columns, (M and N being integers) is linearly transformed via a wavelet transform and ordering system 24 into a matrix of wavelet coefficients 30. As will be described in more detail below, the transform and ordering system 24, which provides a first stage of image compression, may apply an iterative sequence of low pass and high pass filtering on the 2D image in both M and N dimensions (e.g., row/column) to provide the matrix of coefficients 30. A contiguous and alternating scan direction encoding system 40 scans (e.g., reads/inputs) wavelet coefficients from the matrix 30 and provides compressed data 44.

In accordance with one aspect of the present invention, encoding scan sequences 48a and 48b are alternated over differing portions of the matrix 30 in order to proved improved compression over conventional systems. This is achieved by exploiting correlations between wavelet coefficients within the matrix 30 as will be described in more detail below. For example, the scan sequence 48a provides a substantially vertical scan of a first portion 52a of the matrix 30, wherein vertical is substantially in either in the Y+ or the Y− direction. The scan sequence 48b provides a substantially horizontal scan of a second portion 52b of the matrix 30, wherein horizontal is substantially in either in the X+ or the X– direction. By alternating scans over differing portions of the matrix 30, encoding efficiency (e.g., increasing probability of encoding highly correlated coefficients in succession is improved in the encoding system 40.

In accordance with another aspect of the present invention, image compression is improved over conventional systems by providing a contiguous scan pattern over differing portions of the matrix 30. This also enables increased encoding efficiency by increasing the probability of encoding highly correlated coefficients in succession. For example, encoding of the first portion 52*a* of the matrix 30 occurs in a contiguous vertical pattern. If the scan of the portion 52*a* were to begin in a Y– direction over a scan segment 54*a*, then a next scan segment 54*b* would be scanned in the Y+ direction of the matrix 30. The contiguous pattern may be repeated over the first portion 52*a* by alternating vertical scan directions in the Y– and Y+ directions, respectively. It is to be appreciated that the scanning direction may begin in either the Y+ or Y– direction and subsequently alternated in the opposite direction to provide a contiguous vertical scan pattern over the portion 52*a*. As depicted in the second portion 52*b*, the contiguous pattern may also be applied in the horizontal direction X– or X+ of the matrix 30. The contiguous scanning patterns described over the portions 52*a* and 52*b* are in contrast to conventional scanning patterns that may scan across the portions starting from the same side (e.g., always scanning in the X+ toward the X– direction).

Figure 2:
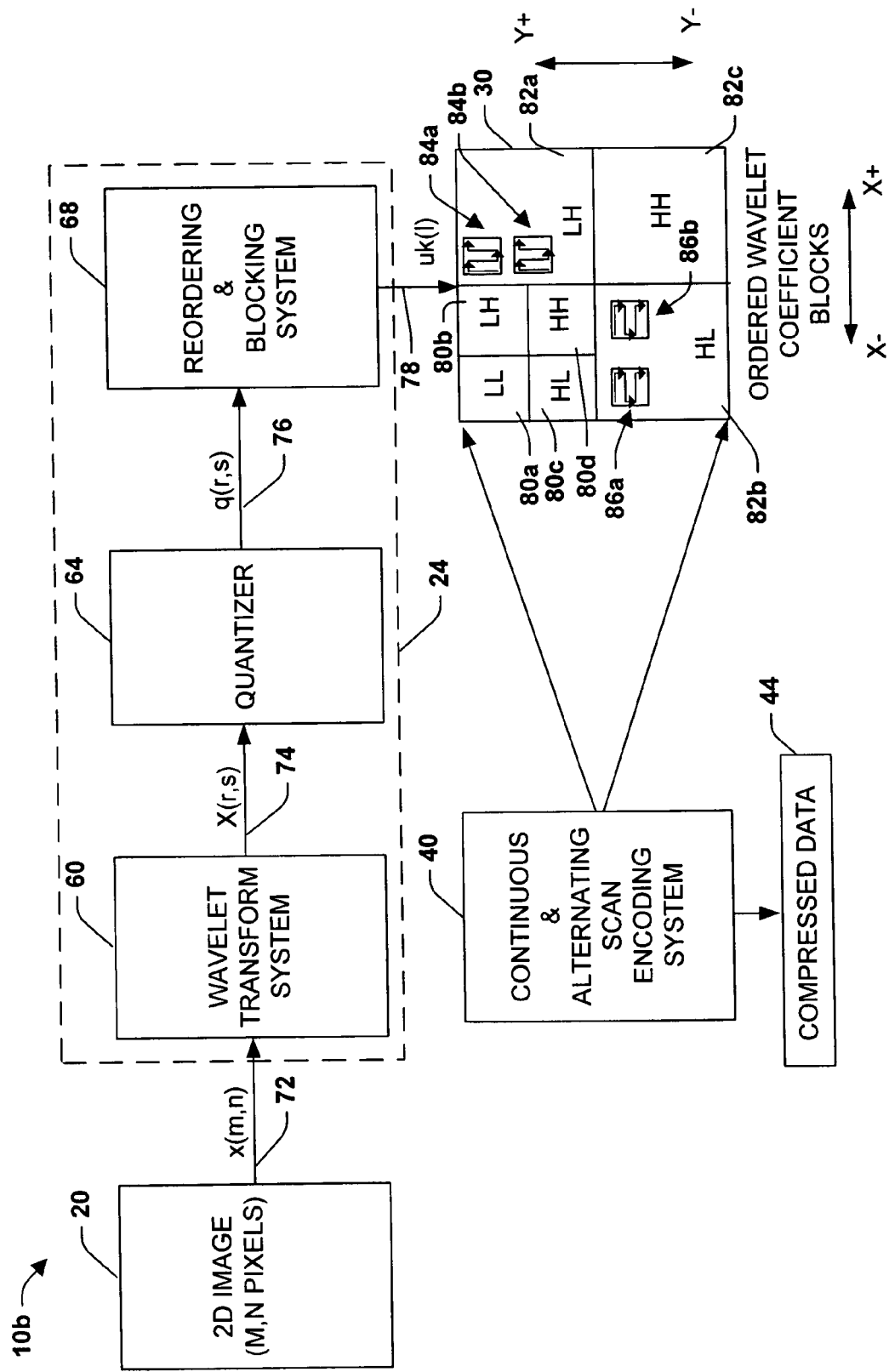
FIG. 2 is a schematic block diagram illustrating a data compression system in accordance with an aspect of the present invention.

Turning now to FIG. 2, a data compression system 10*b* is illustrated in accordance with an aspect of the present invention. As described above, the 2D image 20 is input to the transform and ordering system 24 to provide a wavelet coefficient matrix 30. The transform and ordering system 24 may include a wavelet transform system 60, a quantizer 64, and a reordering and blocking system 68. The wavelet transform system 60 processes the image 20 as a row/column array having the characteristic of x(m, n) 72, wherein m=0, 1, . . . , M–1, n=0, 1, . . . , N–1, and computes wavelet transform coefficients X(r,s) 74, wherein r=0, 1, . . . , M–1, s=0, 1, . . . ,N–1.

Wavelet transform processing which is well understood, may be achieved by applying both low pass filtering and high pass filtering to the image 20 in both horizontal and vertical directions (e.g., horizontal/row, vertical/column), wherein low pass filtering provides an averaging transform of neighboring image pixels to wavelet coefficients, and high pass filtering provides a differencing frequency domain transform of neighboring pixels. For example, a low—low (LL) transform of the image 20 may consist of a vertical low pass followed by a horizontal low pass. A low-high (LH) transform may consist of a vertical low pass followed by a horizontal high pass. Similarly, a high-low (HL) transform may consist of a vertical high pass followed by a horizontal low pass, wherein a high—high (HH) transform may consist of high pass filtering applied in both directions.

The output X(r,s) 74 of the wavelet transform system 60 is received by a quantizer 64 wherein wavelet coefficients are quantized (e.g., reduced in precision) in order to provide a first level of compression (e.g., reduction in number of bits required to store coefficients).

Each coefficient X(r,s) 74 may be quantized according to the following equation to provide a quantized output q (r,s) 76:

$$q(r,s)76 = sgn(X(r,s))[|X(r,s)|/T],\qquad \text{Equation 1:}$$

wherein sgn( ) is a signum function and T is a quantization factor. The quantizer 64 maps the wavelet coefficients X(r,s) 74 into a sequence of integers q(r,s) 76. It is noted that there is some image information loss introduced by the quantizer 64.

The quantized coefficients 76 are then input to the reordering and blocking system 68, wherein quantized coefficient blocks uk(l) 78 are generated and provided to the coefficient matrix 30. The quantized coefficient blocks 78 may be reordered and grouped into blocks according to the following equation:

$$u_k(l)78 = q(r_k + mod(1, M_B), s_k + [1/M_B]),\qquad \text{Equation 2}$$

wherein l=0, 1, . . . ,L–1 and k=0, 1, . . . ,K–1, wherein L=$M_B N_B$ which is the matrix block size, K=MN/L is the number of blocks, and $M_B$ and $N_B$ are the sizes of the blocks (e.g., 10×10, 5×5, 20×20) of quantized coefficients that are grouped in $u_k(l)$. For each k, the top left corner indices ($r_k$, $s_k$) are defined according to the scan order described below in relation to FIG. 3.

After the quantized coefficients are reordered, the matrix 30 may be grouped according to sub-bands that are associated with the low and high pass filtering that was iteratively applied to the image by the wavelet transform system 60. For example, an LL sub-band 80*a*, an LH sub-band 80*b*, an HL sub-band 80*c*, and a HH sub-band 80*b* may be generated for lower order coefficients. An LH 82*a*, HL 82*b*, and HH 82*c* sub-band may also be included for higher order coefficients. It is to be appreciated that other higher order LH, HL, and HH sub-bands may be similarly generated. As will be described in more detail below in relation to FIG. 3, the LH sub-bands, 80*b* and 82*a* may be scanned with a vertical contiguous pattern such as depicted by patterns 84*a* and 84*b*. The HL sub-bands 80*c* and 82*b* may be scanned with a horizontal contiguous pattern such as depicted by patterns 86*a* and 86*b*. In this manner, correlations are likely to occur between the LH and HL bands during encoding which results in higher correlation between successively encoded coefficients and hence, improved data compression. It is noted that the LL band 80*a* and the HH bands 80*d* and 82*c* may be scanned in either a horizontal or vertical contiguous pattern. It can also be noted that the horizontal and vertical direction are less important for these sub-bands than in HL and LH since HL and LH employ different filters in vertical and horizontal directions. Therefore, an alternative scanning strategy may be utilized for LL and HH, such as, for instance, Peano scanning (with no blocking), or diagonal scanning.

The continuous and alternating scan direction encoding system 40 may employ a plurality of well known encoding techniques during the scanning described above in order to provide the compressed data 44. For example, adaptive run-length encoding (RLE) such as Golomb-Rice encoding may be utilized. Other encoding techniques may also be employed to encode the coefficients such as adaptive arithmetic coding (AC).

Figure 3:
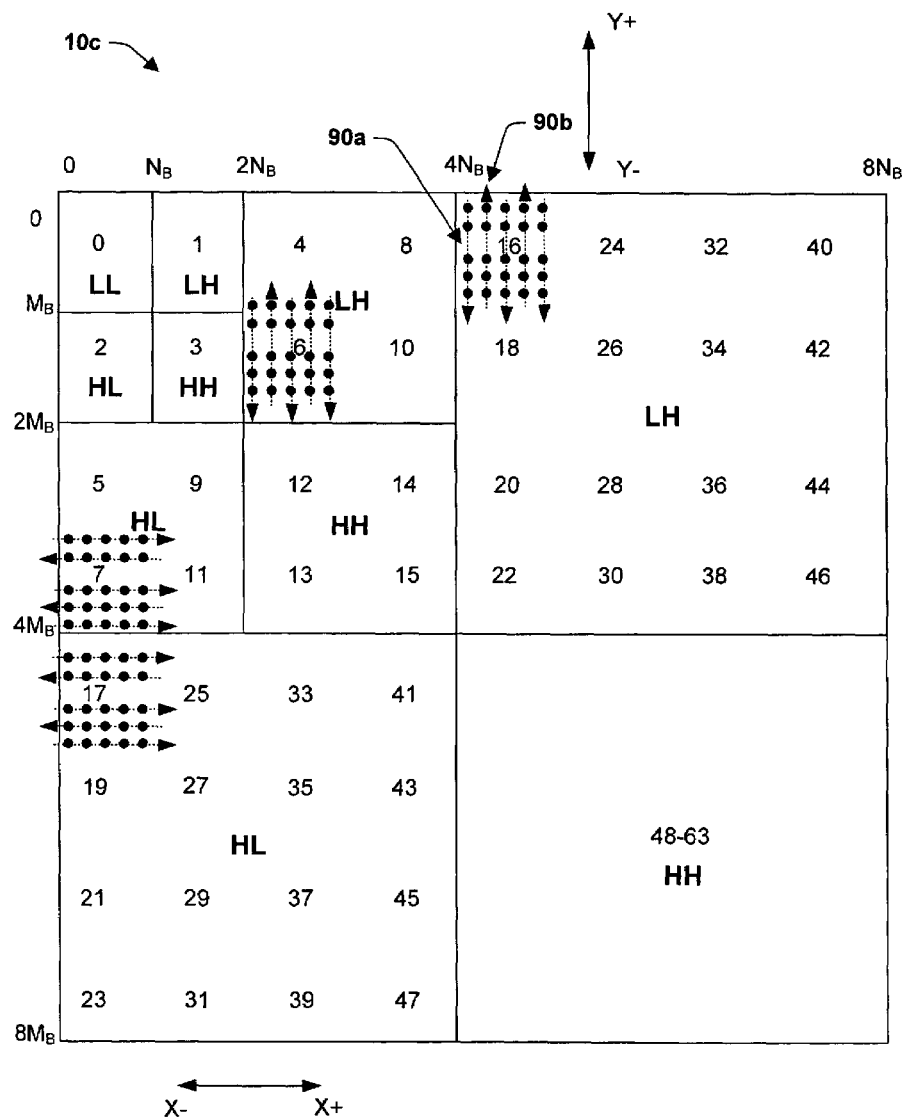
FIG. 3 is a diagram illustrating an exemplary scan sequence in accordance with an aspect of the present invention.

Referring now to FIG. 3, a reordered matrix 10*c* and encoding sequence is illustrated in accordance with an aspect of the present invention. To reorder the wavelet coefficients, as described in relation to the reordering and blocking system 68 illustrated in FIG. 2, a sequence is defined of top left corner indices (e.g., rk, sk). The coefficient scanning order may be described as depicted in FIG. 3, wherein MB and NB control the size of each coefficient block. The block sizes should be selected to maximize compression and can be evaluated empirically. A block size of 10×10 yields effective results. It may be observed from FIG. 3, that a scanning sequence is provided based upon top left corner indices (rk, sk), defined above. For example, the first block (# 0) may contain coefficients of level 0 of a wavelet tree (e.g., coarsest resolution). Blocks 0 to 3 may include coefficients of level 2, and so forth. It is noted that coefficient blocks are alternated from LH and HL sub-bands at each level.

A purpose for alternate block scanning of the low-high (LH) and high-low (HL) wavelet coefficients within the same resolution level is to enable higher compression encoding. If the original image has a particular feature (or no feature) at a given spatial location, it is likely that clusters of both the LH and HL sub-bands, corresponding to that location, will have large or small values. Therefore, by encoding pairs of blocks from the LH and HL sub-bands corresponding to similar spatial locations, clusters of large and small values are more likely to be created. This increases the probability of longer runs of zeros in the bit planes of the quantized coefficients resulting in higher compression.

As illustrated in FIG. 3, coefficient blocks of 0 to 63 are depicted. For example, blocks 0 through 3, depict a set of level (0) coefficients LL, LH, HL, and HH sub-bands respectively, wherein blocks 4 though 15 depict a set of LH, HL, HH sub-bands of level (2) coefficients, wherein blocks 16–63 represent a set of level (3) coefficients. In accordance with the contiguous and alternating scanning of the present invention, each block (0–63) is contiguously scanned in the order of each block. For example, beginning with block 0, an LL band is scanned. LH, HL, and HH Blocks 1, 2, and 3 are then scanned. Coefficient blocks 4 though 11 are then alternately scanned in the LH and HL sub-bands. HH blocks 12 though 15 are then scanned and a similar sequence is followed for blocks 16 through 63.

As each block 0 though 63 is scanned, a contiguous scanning pattern is applied within each block. As described above, either a contiguous horizontal or vertical scanning pattern may be employed within each LL or HH coefficient block. Within each LH coefficient block, a contiguous vertical (Y+ or Y−) direction is employed in each block, and within each HL coefficient block, a contiguous horizontal (X+ or X−) direction is employed in each block. For example, a 5×5 block of coefficients is illustrated at block 16 in the LH sub-band. A first column of coefficients 90a may be scanned in the Y− direction wherein an adjacent column of coefficients 90b may be scanned in the Y+ direction. This pattern may be repeated throughout block 16 wherein adjacent columns of coefficients are scanned in opposite directions. As described above, scanning may begin in an LH section in either the Y+ or the Y− direction and then alternated thereafter to provide a contiguous pattern over the block. As illustrated, HL block 17, which is the next coefficient block to be encoded in the sequence, is scanned in a horizontal contiguous pattern, wherein scanning is directed across coefficient rows of block 17 in an alternating X+ and X− direction.

Figure 4:
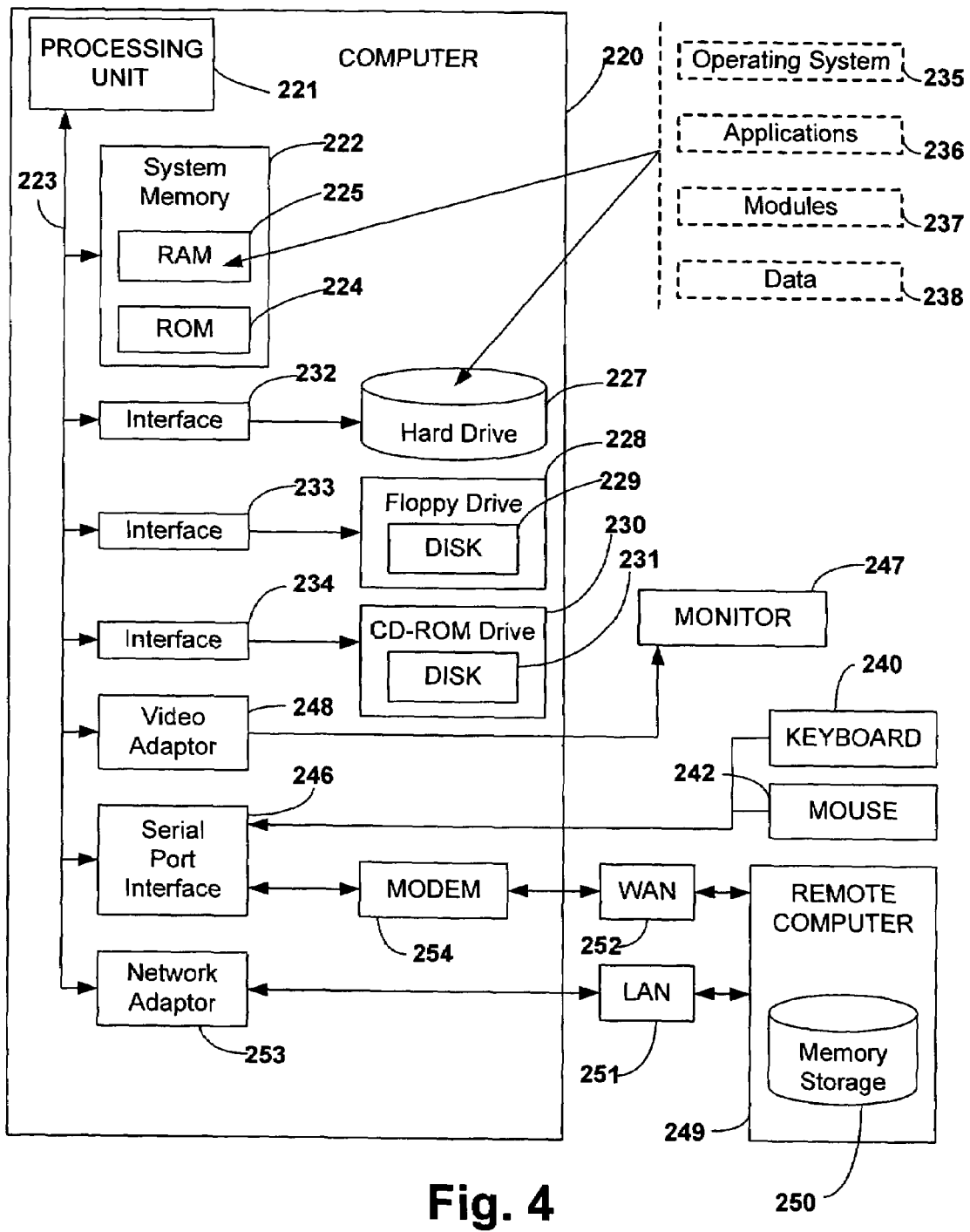
FIG. 4 is a schematic block diagram illustrating a system in accordance with an aspect of the present invention.

In order to provide a context for the various aspects of the invention, FIG. 4 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 4, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors, including but not limited to Intel x86, Pentium® and compatible microprocessors from Intel and others, including Cyrix, AMD and Nexgen; Alpha® from Digital; MIPS® from MIPS Technology, NEC, IDT, Siemens, and others; and the PowerPC® from IBM and Motorola. Dual microprocessors and other multi-processor architectures also can be used as the processing unit 221. Dual microprocessors and other multi-processor architectures also may be employed as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft® operating system (e.g., Windows® NT operating system). It is to be appreciated that other operating systems may be employed such as UNIX, LINUX, for example.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 4. The logical connections depicted in FIG. 4 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A data compression system, comprising:
    a scanning component which scans at least a portion of a transformed image, wherein the scan is performed substantially in a horizontal direction on a first section of the portion and in a vertical direction on a second section of the portion to enable improved data compression of the transformed image; and
    a quantizer that reduces stored data associated with wavelet coefficients that correspond to the transformed image.

2. The data compression system of claim 1, wherein the horizontal and vertical scan directions are performed via a contiguous scan of the respective sections to enable improved data compression of the transformed image.

3. The data compression system of claim 1, further comprising a wavelet transform subsystem for transforming image into wavelet coefficients via low pass and high pass filters applied to the image.

4. The data compression system of claim 3, further comprising a reordering and blocking subsystem to provide a matrix of wavelet coefficients that are organized into at least one of low—low (LL), low-high (LH), high-low (HL), and high—high (HH) sub-bands.

5. The data compression system of claim 4, wherein the LH sub-bands are scanned in the vertical direction and the HL sub-bands are scanned in the horizontal direction.

6. The data compression system of claim 4, wherein the LL and HH sub-bands are scanned in either the horizontal or the vertical direction.

7. The data compression system of claim 4, wherein run length encoding is employed to encode the scanned coefficients.

8. The data compression system of claim 7, wherein at least one of Golomb-Rice encoding and Arithmetic encoding is employed to encode the scanned coefficients.

9. A method for providing a data compression system, comprising:
    scanning at least a portion of a transformed image in substantially a horizontal direction on a first section of the portion;
    scanning in a vertical direction on a second section of the portion of the transformed image to enable improved data compression of the transformed image; and
    reducing data associated with wavelet coefficients that correspond to the transformed image.

10. The method of claim 9, further comprising:
    transforming an image into wavelet coefficients via low pass and high pass filters applied to the image.

11. The method of claim 10, further comprising:
    reordering and blocking to provide a matrix of wavelet coefficients that are organized into at least one of low—low (LL), low-high (LH), high-low (HL), and high—high (HH) sub-bands.

12. The method of claim 11, wherein the LH sub-bands are scanned in the vertical direction and the HL sub-bands are scanned in the horizontal direction.

13. The method of claim 11, wherein the LL and HH sub-bands are scanned in either the horizontal or the vertical direction.

14. The method of claim 9, wherein the horizontal and vertical scan directions are performed via a contiguous scan of the respective sections to enable improved data compression of the transformed image.

15. A data compression system, comprising:
 means for scanning at least a portion of a transformed image in substantially a horizontal direction on a first section of the portion;
 means for scanning in a vertical direction on a second section of the portion of the transformed image to enable improved data compression of the transformed image; and
 means for reducing data associated with wavelet coefficients that correspond to the transformed image.

16. The data compression system of claim 15, further comprising:
 means for transforming an image into wavelet coefficients via low pass and high pass filters applied to the image.

17. The data compression system of claim 16, further comprising:
 means for reordering and blocking to provide a matrix of wavelet coefficients that are organized into at least one of low—low (LL), low-high (LH), high-low (HL), and high—high (HH) sub-bands.

18. The data compression system of claim 17, wherein the LH sub-bands are scanned in the vertical direction and the HL sub-bands are scanned in the horizontal direction.

19. The data compression system of claim 15, wherein the horizontal and vertical scan directions are performed via a contiguous scan of the respective sections to enable improved data compression of the transformed image.

* * * * *

UNITED STATES PATENT AND TRADEMARK OFFICE
CERTIFICATE OF CORRECTION

PATENT NO. : 7,065,252 B1
APPLICATION NO. : 11/091068
DATED : June 20, 2006
INVENTOR(S) : Henrique S. Malvar et al.

It is certified that error appears in the above-identified patent and that said Letters Patent is hereby corrected as shown below:

On the title page, item (56), under "Other Publications", in column 2, line 2, delete "STandard," and insert -- Standard, --, therefor.

On page 2, item (56), under "Other Publications", in column 1, line 16, delete "Consuner" and insert -- Consumer --, therefor.

On page 2, item (56), under "Other Publications", in column 2, line 14, after "Domain"," insert -- IEEE, --.

In column 10, line 26, in Claim 3, after "transforming" insert -- an --.

Signed and Sealed this

Twentieth Day of July, 2010

David J. Kappos
*Director of the United States Patent and Trademark Office*